United States Patent [19]

Harston et al.

[11] Patent Number: 5,113,362

[45] Date of Patent: May 12, 1992

[54] INTEGRATED INTERPOLATOR AND METHOD OF OPERATION

[75] Inventors: Stephen W. Harston, Newbury, Great Britain; Judson S. Leonard, Waban, Mass.

[73] Assignee: Analog Devices, Inc., Norwood, Mass.

[21] Appl. No.: 521,904

[22] Filed: May 11, 1990

[51] Int. Cl.$^5$ ............................................... G06F 7/38
[52] U.S. Cl. ...................................... 364/723; 364/786
[58] Field of Search .................. 364/723, 718, 724.01, 364/724.1, 784, 786

[56] References Cited

U.S. PATENT DOCUMENTS

| | | | |
|---|---|---|---|
| 4,639,920 | 1/1987 | Kaneko | 364/723 X |
| 4,718,104 | 1/1988 | Anderson | 364/723 X |
| 4,757,465 | 7/1988 | Hakoopian et al. | 364/723 |
| 4,837,722 | 6/1989 | Sara | 364/723 |
| 4,901,266 | 2/1990 | Takagi | 364/723 |
| 4,951,244 | 8/1990 | Meyer | 364/723 |

Primary Examiner—Tan V. Mai
Attorney, Agent, or Firm—Wolf, Greenfield & Sacks

[57] ABSTRACT

An interpolator circuit is formed from a chain of multiplexer/adder circuits. Each multiplexer/adder circuit selects one of the two multi-bit binary values which are to be interpolated in accordance with one bit of a multi-bit ratio value. The selected value is shifted and added to the output of a previous stage in the chain. When one of the two values is injected into the first stage, the final sum generated by the circuit chain is the interpolated value.

15 Claims, 3 Drawing Sheets

5,113,362

INTEGRATED INTERPOLATOR AND METHOD OF OPERATION

FIELD OF THE INVENTION

This invention relates to circuits for providing linear interpolation between two multi bit binary values in accordance with a third multi-bit binary value.

BACKGROUND OF THE INVENTION

In many circumstances, it is desirable to obtain a binary value which is an interpolated value lying between two multi bit binary values where the ratio of the two values is determined by a third multi bit value. For example, in a color video monitor of the type that is commonly used with personal computers, each color which can be displayed by the monitor is typically coded as an eight bit binary number. It is desirable with such a system to be able to obtain a "mixed color" signal, which color lies between two other colors on the established color spectrum. This is especially useful at the edges of the monitor screen where a background or border color is displayed at the edges of the screen. In order to provide a pleasing transition between the border color and the main portion of the display, it is desirable to interpolate between the two binary numbers which represent the main display color and the border color.

Accordingly, it is an object of the present invention to provide a interpolator circuit which can interpolate between two multi bit binary values.

It is another object of the present invention to provide an interpolation circuit in which the ratio of the two multi bit binary values is determined by a third multi bit binary value.

It is still a further object of the present invention to provide an interpolation circuit which can be implemented as an integrated circuit.

It is yet a further object of the present invention to provide an interpolation circuit which is capable of being operated in a "pipelined" manner.

SUMMARY OF THE INVENTION

The foregoing objects are achieved and the foregoing problems are solved in one illustrative embodiment of the invention in which an interpolator circuit is formed from a chain of multiplexer/adder circuits. Each multiplexer/adder circuit selects one of the two multi bit binary values which are to be interpolated in accordance with one bit of a multi bit ratio value. The selected value is added to the output of a previous stage in the chain. When one of the two values is injected into the first stage, the final sum generated by the circuit chain is the interpolated value.

DETAILED DESCRIPTION OF THE PREFERRED EMBODIMENT

Figure 1:
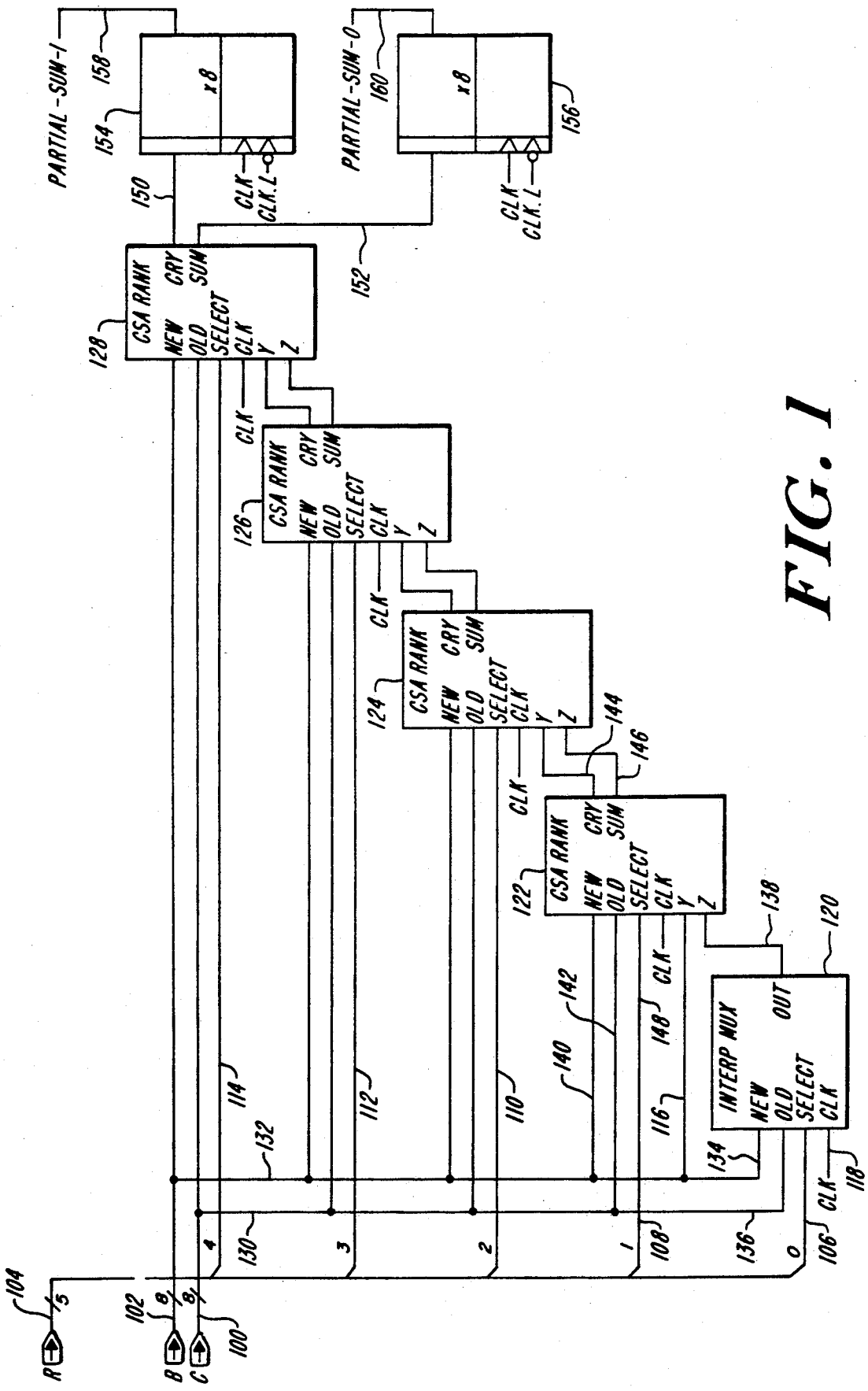
FIG. 1 is a block diagram of the multiplexer/adder chain which generates a pair of partial sums which determine the interpolated output.

The inventive interpolator operates by combining an "old" binary data value and a "new" binary data value in accordance with a ratio or "mix" word to generate a multi bit binary interpolated output. If "A" represents the old, multi-bit binary value and "B" represents the new multi bit binary value and "R" represents the ratio or mix binary value, the interpolated output can be expressed as:

$$(new + (ratio \times (old - new))) = (B + (R \times (A - B))) \quad (1)$$

In this case when $R=0$, the interpolated output is equal to B (new) and when $R=1$, the interpolated output is equal to A (old). Expression (1) can also be expressed as:

$$((R \times A) + (1-R) \times B) \quad (2)$$

Since $$(1-R) = (1 + (-R)) \quad (3)$$

and $(-R)$ can be expressed (in two's complement notation) as:

$$(-R) = (\bar{R} + 2^{-N}) \quad (4)$$

where N is the total number of bits in R, then:

$$(1-R) = (1 + \bar{R} + 2^{-N}) \quad (7)$$

Inserting expression (7) into expression (2), the interpolated value can be expressed as:

$$(R \times A) + (1 + \bar{R} + 2^{-N}) \times B \quad (8)$$

Since R is a ratio, it will always be positive and less than "one" so that it can be written as a binary fraction which is expressed as:

$$R = 0. r_1 r_2 r_3 \ldots r_N \quad (9)$$

where N is the total number of bits in R and $r_1$ is a binary "1" or "0" and denotes whether R includes the value $\frac{1}{2}$. Similarly, $r_2$ denotes whether R includes the value $\frac{1}{4}$ and $r_N$ denotes whether R includes the value $\frac{1}{2}^N$.

Therefore, the value R can be expressed as:

$$R = 0 + \sum_{i=1}^{i=N} r_i 2^{-i} \quad (10)$$

If the value R is given by equation (10) above, then $\bar{R}$ can be expressed as:

$$\bar{R} = 1 + \sum_{i=1}^{i=N} \bar{r}_i 2^{-i} \quad (11)$$

Consequently, equation (7) above is equivalent to:

$$(1 + \bar{R} + 2^{-N}) = 1 + 1 + \sum_{i=1}^{i=N} \bar{r}_i 2^{-i} + 2^{-N} \quad (12)$$

Since R is positive and we are concerned with a limited number of bits, the term $(1+1)=0$ in binary (the carry bit can be discarded), expression (7) is given by:

$$(1 + \bar{R} + 2^{-N}) = \sum_{i=1}^{i=N} \bar{r}_i 2^{-i} + 2^{-N} \quad (13)$$

Putting expressions (10) and (13) into expression (8), the value of the interpolated binary number is:

$$\sum_{i=1}^{i=N} r_i 2^{-i} \times A + \left[\sum_{i=1}^{i=N} \bar{r}_i 2^{-i} + 2^{-N}\right] \times B \quad (14)$$

which can be re-expressed as:

$$\sum_{i=1}^{i=N} (r_i \times A + \bar{r}_i \times B) 2^{-i} + 2^{-N} \times B \quad (15)$$

or:

$$\sum_{i=1}^{i=N} (\text{mux } A, B, r_i) 2^{-i} + 2^{-N} \times B \quad (16)$$

where the function (mux A, B, $r_i$) indicates that A is selected if $r_i$ is "one" and B is selected if $r_i$ is "zero".

Consequently, it can be seen that the expression for the interpolated output value is determined by selecting either the A value or the B value depending on the value of each of the bits in the ratio value R, multiplying the selected values by $2^{-i}$, where 'i' indicated which bit in the ratio value R was used to select between the A value and the B value, summing the products and adding the term $2^{-N} \times B$.

A circuit which implements expression (16) is shown in FIG. 1. This circuit combines two eight bit binary values A (old) and B (new) under control of a five bit ratio value R. In the illustrated circuit, if R is all "zero"s, then the interpolated output is equivalent to the B input. Alternatively, if the R value is all "one"s, then the interpolated output is 1/32 of the B (new) value and 31/32 of the A (old) value.

The illustrative circuit consists of a multiplexer 120 and four multiplexer/adders 122-128. As the circuits are cascaded and clocked, the entire circuit can be operated in a pipelined fashion. The outputs of the last multiplexer/adder 128 are two partial sums which are stored in registers 154 and 156. As will hereinafter be described in detail, these partial sums are added together by a look-ahead adder circuit 295 shown in FIG. 2 to produce the final interpolated value.

An eight bit value for the old value A is provided on eight bit bus 100. Similarly, an eight bit value for the new, or B value, is provided on eight bit bus 102. The binary ratio value R is provided on five bit bus 104.

Since R has five bits, N=5 in expression (16) and the least significant bit portion ($2^{-5}$) of the sum in expression (16) above is developed by multiplexer 120. Multiplexer 120 receives the B value at its input bus 134 and the A value at its input bus 136. Either the A or the B value is selected by means of a signal at the select input 106 which is connected to the least significant bit (bit zero) of the R value. The selected input appears at the output 138. Multiplexer 120 is also controlled by a clock signal appearing on lead 118 which synchronizes the output of the multiplexer to the clock signal.

Figure 3:
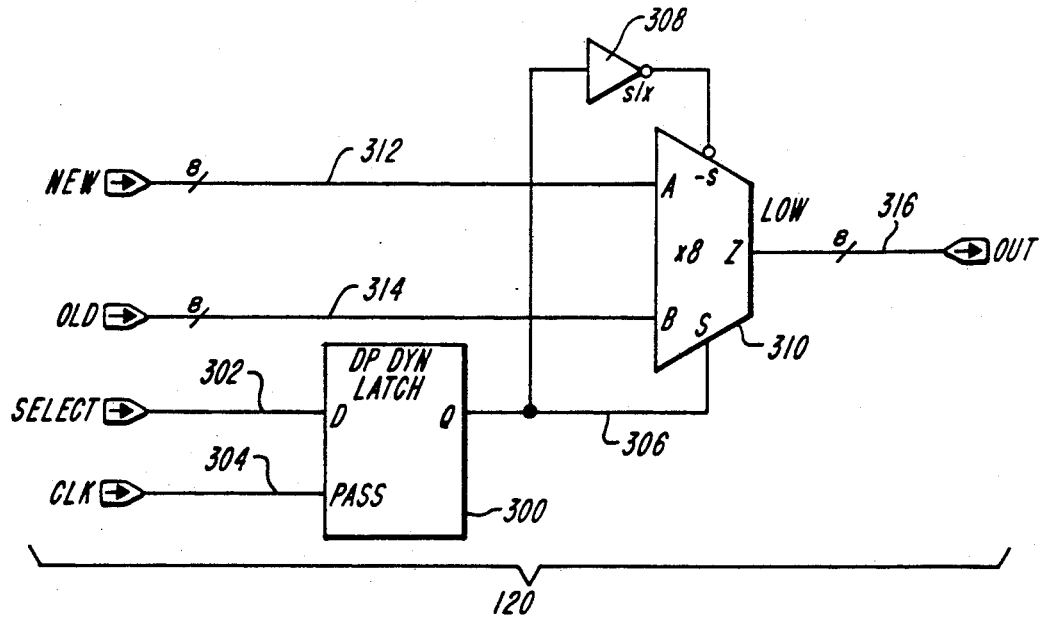
FIG. 3 is a more detailed block diagram of the multiplexer circuit 120 used in FIG. 1.

FIG. 3 shows a more detailed block diagram of multiplexer 120. The R value or select signal is applied, via lead 302, to the D input of a D type latch 300. The clock input on lead 304 is applied to the clock input of latch 300 so that the select signal is clocked into the latch and held for one clock period. This allows for pipelining of the multiplexer/adder chain. The output of latch 300 is applied, via lead 306 and inverter 308, to the select inputs of multiplexer 310. Multiplexer 310 is thus controlled by means of the output of latch 300 to select either the B (new) value on bus 312 or the A (old) value on bus 314 and apply this to the output bus 316.

Referring back to FIG. 1, the value on eight-bit output bus 138 of multiplexer 120 is applied to the Z input of multiplexer/adder 122. The Y input of multiplexer/adder 122 receives the B (new) value, via bus 116, from bus 132. The B (new) word is also applied, via bus 140, to the "new" input of circuit 122. The A (old) value is applied, via bus 140, to the "old" input of circuit 122. As will hereinafter be explained in detail, circuit 122 selects either the "old" or "new" value in accordance with the bit value applied, via lead 148, to the select input and adds the selected value to the sum of the signals appearing at the Y and Z inputs. The addition process produces a sum output signal on bus 146 and a carry output signal on bus 144.

Figure 4:
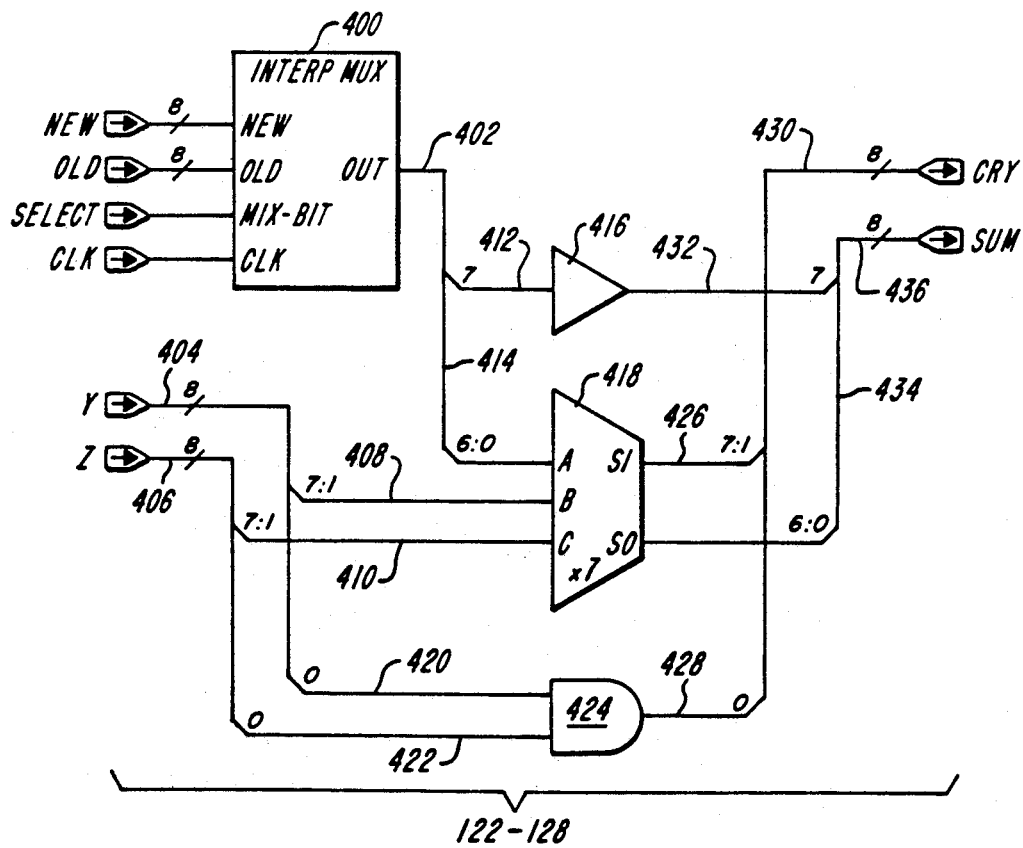
FIG. 4 is a more detailed block diagram of the multiplexer/adder circuits 122-128 used in the circuit chain shown in FIG. 1.

As shown in FIG. 4, each multiplexer/adder (122-128) consists of a multiplexer 400 and full adder circuit 418. Multiplexer 400 is equivalent to multiplexer 120 shown in FIG. 1 and disclosed in more detail in FIG. 3. Multiplexer 400 receives a new value, an old value, a select signal and a clock signal, as previously described. The output of multiplexer 400 on bus 402 is split into two sections. The high order bit (bit 7) is split off on lead 412 and applied to a buffer amplifier 416. The seven remaining least significant bits (bits 0-6) on bus 414 are provided to the A input of carry-save adder 418. Adder 418 is a seven bit carry-save adder which adds the seven bit signals at its A, B and C inputs to produce a seven bit sum (S0) on its output 434 and a seven bit carry value (S1) on its output bus 426.

The eight bit Y input on bus 404 is also divided into two parts. The seven most significant bits (bits 1-7) on bus 408 are provided to a second input of adder 418. In a similar manner, the seven most significant bits of the Z input on bus 406 are provided, via bus 410, to the C input of adder 418. The least significant bit (bit 0) of the Y and Z inputs to the circuit are provided, via leads 420 and 422, to AND gate 424. The output of AND gate 424 becomes the least significant bit of the carry output on lead 428 and is combined with the seven-bit carry output (S1) developed by adder 418 on output bus 426 to produce an eight bit carry output on bus 430. In a similar manner, the seven bit sum output (S0) of adder 418 on bus 434 is combined with the output of buffer 416 on lead 432 to generate a eight bit sum value on output bus 436. Because the seven least significant bits at the output of multiplexer 400 are added to the seven most significant bits of the Y and Z inputs, the Y and Z inputs are effectively shifted down or divided by two with respect to the output of multiplexer 400. Consequently each multiplexer adder stage generates a term of the form: $(\text{mux } A, B, r_i) \times 2^{-i} + (Y+Z) \times 2^{-i-1}$.

Referring back to FIG. 1, it can thus be seen that the output of multiplexer 120 is the term mux (A, B, $r_5$)$\times 2^{-5}$. Consequently, the output of multiplexer/adder 122 is the term mux (A, B, $r_4$)$\times 2^{-4}$+mux (A, B, $r_5$)$\times 2^{-5}$+B$\times 2^{-5}$.

In a similar manner, circuit 124 receives the carry and sum outputs on buses 144 and 146 from circuit 122 and adds the next term in the sequence (mux(A, B, r$_3$)×2$^{-3}$). The entire sum in expression (16) is thus developed term-by term by the circuits 122-128. Circuit 128 produces two outputs, a carry output on bus 150 and a sum output on bus 152. These are provided to pipeline latches 154 and 156 which temporarily store the partial sums generated by circuit 128. This temporary storage is necessary for the look ahead adder circuit shown in FIG. 2. The outputs of registers 154 and 156 on buses 158 and 160, respectively, are provided to the carry-select adder circuit.

Figure 2:
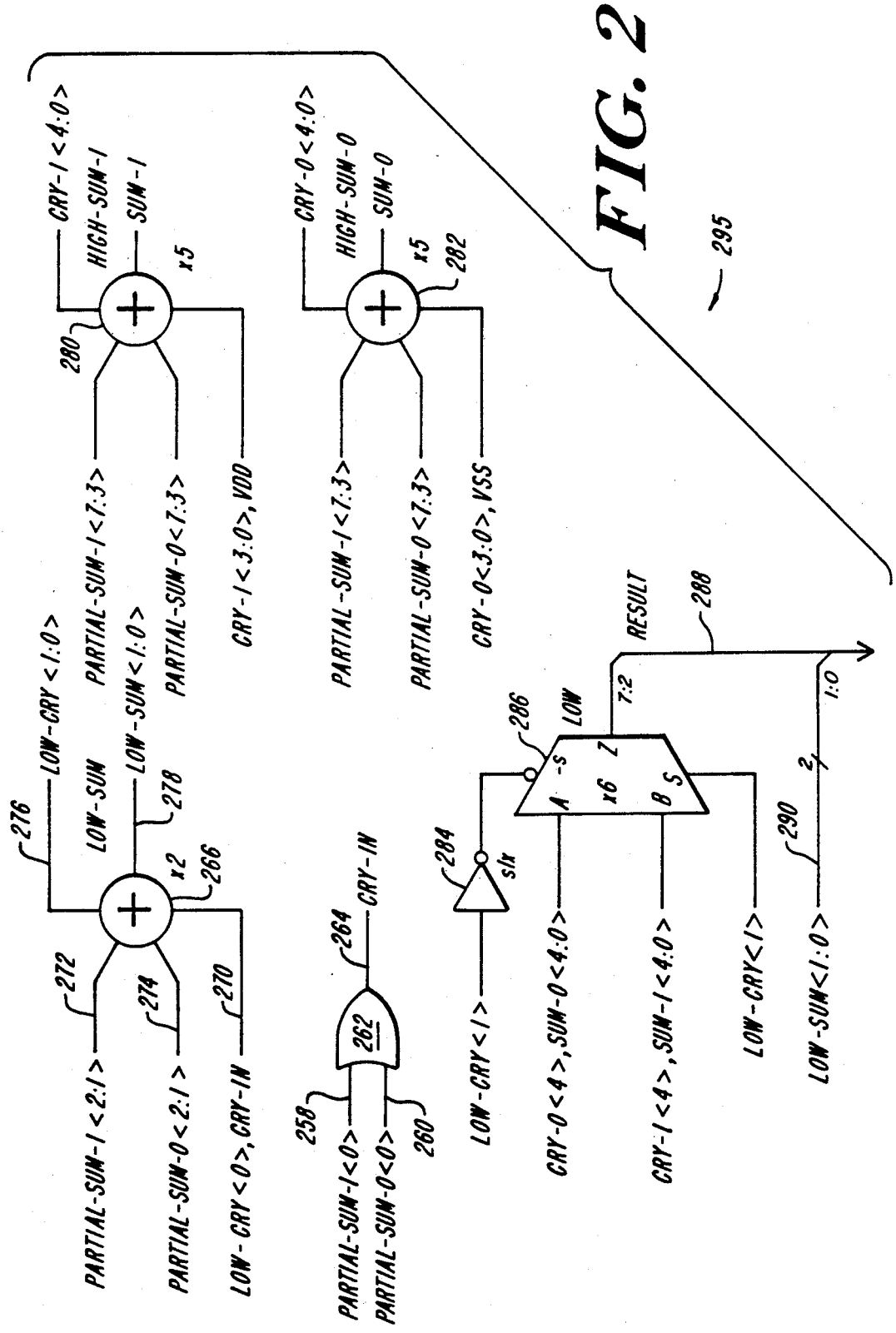
FIG. 2 is a block diagram of a carry-select adder circuit which adds the partial sums generated by the multiplexer chain shown in FIG. 1 to produce the final interpolated output.

The carry-select adder circuit shown in FIG. 2 is a standard circuit which splits the partial sums into three bit and five bit pieces. In order to speed the final addition, the three bit sums and five bit sums are evaluated in parallel and then combined. In particular, the least significant bits of partial sum zero and partial sum one on leads 258 and 260 from latches 158 and 160 are provided to OR-gate 262 to generate the least significant bit (LSB) of a the carry input (Cry-In) 264 to adder circuit 266. The carry LSB input on lead 264 is combined with the LSB of the carry output of adder 266 (Low Cry, bit 0) and provided as a two bit carry input value via bus 270. Adder 266 adds the lowest two bits (bits 1-2) of partial sums zero and one on buses 274 and 272 together with two-bit carry input provided on bus 270. Adder 266 generates two sums: a low sum consisting of two bits and a low carry consisting of two bits on output buses 278 and 276, respectively.

In order to speed the operation of the circuit, adders 280 and 282 generate two sum and carry values simultaneously with the operation of adder 266. In particular, adder 280 generates the sum of the most significant bits (MSBs) of partial sums zero one assuming that the carry bit from adder 266 was a "one". Adder adder 280 generates the sum of the MSBs (bits 3-7) of partial sums zero one assuming that the carry bit from adder 266 was a "zero". The actual carry bit generated by adder 266 is then used to select one of the sums previously computed by adders 280 and 282.

More particularly, adder 280 generates the sum of the MSBs (bits 3-7) of partial sums zero one and a four-bit carry input. The three carry MSBs are taken from the carry output (Cry 1, bits 0-3) of adder 280. The LSB of the carry input is fixed at "one" (that is, V$_{dd}$).

In a similar manner, adder 282 generates the sum of the five MSBs of partial sum zero and partial sum one in the case that the carry generated by adder 266 is "zero" (indicated by a LSB carry bit fixed at the V$_{ss}$).

The output of adder 282 is a four bit sum output designated as High-Sum zero and a four bit carry output designated as Cry 0. In a similar manner, the output of adder 280 is a four bit sum output designated as High Sum 1 and a four-bit carry output designated as Cry 1.

These sum and carry values are provided to multiplexer 286 which is controlled by the MSB of the carry output (Low Cry) generated by adder 266 and provided to the positive selection input of multiplexer 286 and the negative selection input of multiplexer 286 by means of inverter 284. This latter carry bit selects the appropriate sum generated by either of adders 280 or 282. The output of multiplexer 286, consisting of a six bit output, is combined with the low sum output of adder 266, via buses 278 and 290, to generate the final interpolated output on bus 288. As described, the circuit shown in FIG. 2 essentially comprises a conventional look-ahead adder.

Although one illustrative embodiment of the invention has been disclosed, that disclosure is intended by way of example only and should not be considered limiting. Additions, changes and modifications and other embodiments will be immediately apparent to those skilled in the art. For example, although the illustrative embodiment uses a simple multiplexer for the first stage in the cascaded circuit stages, the first stage could easily be a multiplexer/adder circuit. In this case the term $2^{-N} \times B$ could be generated by injecting the B value into the one input of the first stage. Similarly, the look-ahead adder used to generate the final output could be replaced by an additional mutiplexer/adder stage so that all stages are identical. These changes and modifications are intended to be covered by the claims below.

What is claimed is:

1. A circuit for generating a multi-bit output value from a first multi-bit binary value and a second multi-bit binary value wherein the ratio of the said first binary value to said second binary value is determined in accordance with a third multi-bit binary value, said circuit comprising:

a plurality of circuit stages, each of said plurality of circuit stages having a first input, a second input and an output, said plurality of circuit stages being connected in cascade from a first stage to a last stage by means of an output of each circuit stage being connected to a first input of a succeeding circuit stage, each of said circuit stages comprising means responsive to one bit of said third binary value for generating an output value by dividing said first stage input by two and adding thereto said first binary value when said one bit is a binary "one" and said second binary value when said one bit is a binary "zero";

means for applying said second multi-bit binary value to a first input of said first circuit stage; and means responsive to another bit of said third binary value for applying to a second input of the first circuit stage said first binary value when said other bit is a binary "one" and said second binary value when the said other bit is a binary "zero".

2. A circuit for generating a multi-bit output value from a first multi-bit binary value and a second multi-bit binary value according to claim 1 wherein said each circuit stages comprises:

a digital adder;

multiplexer means responsive to said one bit of said third binary value for applying said first binary value to a first input of said digital adder when said one bit is a binary "one" and for applying said second binary value to said first input of said digital adder when said one bit is a "zero"; and means for dividing said second stage input by two and applying the resulting quotient to a second input of said digital adder, said digital adder thereupon computing the sum of said first input, said second input to generate said output of the circuit stage.

3. A circuit according to claim 1 wherein each of said circuit stages receives one bit of said third multi-bit binary value and a least significant bit of said third multi-bit binary value is applied to said first circuit stage and a most significant bit of said third multi-bit binary value is applied to said last circuit stage.

4. A circuit for generating a multi-bit output value from a first multi-bit binary value and a second multi-bit binary value wherein the ratio of the said first binary value to said second binary value is determined in accordance with a third multi-bit binary value, said circuit comprising:
- a plurality of circuit stages, each stage having a plurality of stage inputs, a plurality of direct inputs and a plurality of outputs, said first, second and third binary values connected to each circuit stage by the direct inputs of the circuit stage, said circuit stages being connected in cascade from a first stage to a last stage by means the outputs of each stage being connected to the stage inputs of a succeeding stage, each of said circuit stages comprising means responsive to one bit of said third binary value for generating an output by dividing said stage inputs by two and adding to the resulting quotient said first binary value when said one bit is a binary "one" and said second binary value when said one bit is a "zero";
- a first multiplexer responsive to a least significant bit of said third multi-bit binary value for applying said first binary value to a stage input of said first stage when said one bit is a binary "one" and applying said second binary value to said stage input of said first stage when said one bit is a "zero"; and
- means for applying said second multi-bit binary value to another stage input of said first circuit stage whereby said multi-bit output value is generated at an output of said last circuit stage.

5. A circuit according to claim 4 wherein said stage inputs, said first multi-bit binary value and said second multi-bit binary values all have N bits and said each circuit stage comprises:
- a digital adder;
- second multiplexer means responsive to said one bit of said third binary value for forwarding the N-1 least-significant bits of said first binary value to a first input of said digital adder when said one bit is a binary "one" and for forwarding the N-1 least-significant bits of said second binary value to said first input of said digital adder when said one bit is a "zero"; and
- means for applying the N-1 most-significant bits of said stage inputs to a second and third input of said digital adder, said digital adder thereupon computing the sum of said input, said second input and said third input to generate said output of said circuit stage.

6. A circuit according to claim 4 wherein said digital adder is a carry-save adder having a sum output and a carry output.

7. A circuit according to claim 6 further comprising an additional adder for adding a sum output of said last stage to a carry output of said last stage to generate said multi-bit output value.

8. A circuit according to claim 7 wherein said additional adder is a look ahead adder.

9. A circuit according to claim 7 further comprising a first latch for temporarily storing said carry output of said last stage and a second latch for temporarily storing said sum output of said last stage.

10. A circuit according to claim 7 wherein said second multiplexer means is responsive to said one bit of said third binary value for forwarding the most-significant bit of said first binary value to the most significant bit of said sum output when said one bit is a binary "one" and for forwarding the most-significant bit of said second binary value to said sum output when said one bit is a "zero".

11. A circuit according to claim 7 further comprising means for forwarding the least significant bit of said stage input to the least significant bit of said carry output.

12. A circuit according to claim 7 wherein each of said stages has a first stage input, a second stage input and a third stage input and said carry save adder has a first input for receiving a carry output from a preceding circuit stage, a second input for receiving a sum output from a preceding circuit stage and a third input for receiving said first binary value and said second binary value from said second multiplexer means.

13. A circuit according to claim 12 further comprising an AND gate responsive to the least significant bit of said first stage input and to the least significant bit of said second stage input for providing an output to the least significant bit of said carry output.

14. A circuit according to claim 4 wherein said multiplexer has a first data input, a second data input, a select input, a clock input and an output and said first multiplexer comprises a D type latch responsive to a select signal at said select input and a clock signal at said clock input for temporarily storing said select signal to generate an output and a third multiplexer connected to said first data input and to said second data input and responsive to the output of said D-type latch for forwarding to said output a signal on one of said first input and said second input.

15. An interpolation method for generating an N-bit output value from a first N-bit binary value and a second N-bit binary value wherein the ratio of said first binary value to said second binary value is determined in accordance with a third M-bit binary value by using an accumulating adder having a first input and a second input, a divider and a multiplexer, said method comprising the steps of:
- A. operating said multiplexer in response to the least significant bit of said third binary value to apply said first binary value to said divider to divide said first binary value by two when said least significant bit of said third binary value is a binary "one" and to apply said second binary value to said divider to divide said second binary value by two when said least significant bit of said third binary value is a binary "zero";
- B. applying the quotient developed by said divider in step A to said first adder input;
- C. applying the accumulated sum output of said adder to said divider to divide the output of said adder by two;
- D. applying the quotient developed by said divider in step C to said second input of said adder;
- E. operating said multiplexer in response to the next most significant bit of said third binary value to apply said first binary value to said first input of said adder when said next most significant bit of said third binary value is a binary "one" and to apply said second binary value to said first input of said adder when said next most significant bit of said third binary value is a binary "zero";
- F. repeating steps C through E for all remaining bits of said third binary value, performing each step by progressively utilizing the next most significant bit of said third binary value; and
- G. using the divider to divide the sum accumulated in said adder by two.

* * * * *